(12) United States Patent
Ohtsuka et al.

(10) Patent No.: US 8,511,910 B2
(45) Date of Patent: Aug. 20, 2013

(54) OPTICAL CONNECTOR AND METHOD OF ASSEMBLING THE SAME

(75) Inventors: Kenichiro Ohtsuka, Kanagawa (JP); Masaki Ohmura, Kanagawa (JP); Masahiro Hamada, Kanagawa (JP); Mitsuru Kihara, Tokyo (JP); Hitoshi Son, Tokyo (JP)

(73) Assignees: Sumitomo Electric Industries, Ltd., Osaka (JP); Nippon Telegraph and Telephone Corporation, Tokyo (JP)

( * ) Notice: Subject to any disclaimer, the term of this patent is extended or adjusted under 35 U.S.C. 154(b) by 464 days.

(21) Appl. No.: 12/601,375

(22) PCT Filed: May 9, 2008

(86) PCT No.: PCT/JP2008/058680
§ 371 (c)(1),
(2), (4) Date: May 4, 2010

(87) PCT Pub. No.: WO2008/143038
PCT Pub. Date: Nov. 27, 2008

(65) Prior Publication Data
US 2010/0290740 A1 Nov. 18, 2010

(30) Foreign Application Priority Data
May 23, 2007 (JP) .................................. 2007-137201

(51) Int. Cl.
*G02B 6/36* (2006.01)
(52) U.S. Cl.
USPC .................................. 385/78; 385/76; 385/77
(58) Field of Classification Search
None
See application file for complete search history.

(56) References Cited

U.S. PATENT DOCUMENTS

| | | | | |
|---|---|---|---|---|
| 3,871,744 A | * | 3/1975 | Bridger et al. | 385/84 |
| 4,147,402 A | * | 4/1979 | Chown | 385/33 |
| 4,373,777 A | * | 2/1983 | Borsuk et al. | 385/139 |
| 4,436,366 A | * | 3/1984 | Abramson | 385/31 |
| 4,518,220 A | * | 5/1985 | Swanson | 385/77 |
| 4,770,488 A | * | 9/1988 | Shank et al. | 385/79 |
| 5,067,226 A | * | 11/1991 | Egner et al. | 29/452 |

(Continued)

FOREIGN PATENT DOCUMENTS

| EP | 0195355 A2 | 9/1986 |
|---|---|---|
| JP | U-63-141906 A | 9/1988 |

(Continued)

OTHER PUBLICATIONS

Extended European Search Report issued in European Application No. 08752563.0 dated Apr. 2, 2013.

*Primary Examiner* — Rhonda Peace
(74) *Attorney, Agent, or Firm* — McDermott Will & Emery LLP

(57) ABSTRACT

It is an object to obtain an optical connector capable of implementing a more reduction in a cost of a work for carrying out an assembly into a site optical fiber, and a method of assembling the optical connector.

An almost sheet-like protecting member 17 for transmitting a light in a predetermined refractive index is stuck to a tip surface of a ferrule 3 having a fiber inserting hole 15 penetrating therethrough with the fiber inserting hole 15 covered, and an optical fiber 14 positioned by a positioning mechanism 5 to be coupled to a rear part of the ferrule 3 has a tip surface inserted through the fiber inserting hole 15 of the ferrule 3 to abut on the protecting member 17 with an elastic force.

5 Claims, 6 Drawing Sheets

(56) References Cited

U.S. PATENT DOCUMENTS

| | | | | |
|---|---|---|---|---|
| 5,230,032 | A * | 7/1993 | Muzslay | 385/66 |
| 5,467,419 | A * | 11/1995 | Roff et al. | 385/92 |
| 6,409,394 | B1 * | 6/2002 | Ueda et al. | 385/80 |
| 6,565,265 | B2 * | 5/2003 | Ohtsuka et al. | 385/78 |
| 7,452,138 | B2 * | 11/2008 | Saito et al. | 385/86 |
| 7,534,051 | B2 * | 5/2009 | Nishioka et al. | 385/60 |
| 7,572,064 | B2 * | 8/2009 | deJong | 385/65 |
| 7,628,549 | B2 * | 12/2009 | Takahashi et al. | 385/98 |
| 7,717,623 | B2 * | 5/2010 | Ohtsuka et al. | 385/53 |
| 7,751,661 | B2 * | 7/2010 | Kadomi et al. | 385/36 |
| 2001/0036341 | A1 * | 11/2001 | Ohtsuka et al. | 385/78 |
| 2004/0071407 | A1 * | 4/2004 | Vergeest | 385/58 |
| 2006/0257079 | A1 * | 11/2006 | Ohtsuka et al. | 385/86 |
| 2008/0013891 | A1 * | 1/2008 | Nishioka et al. | 385/59 |
| 2008/0075406 | A1 * | 3/2008 | Kadomi et al. | 385/79 |
| 2010/0086258 | A1 * | 4/2010 | Ohtsuka et al. | 385/73 |
| 2010/0220960 | A1 * | 9/2010 | Ohtsuka et al. | 385/72 |
| 2010/0247039 | A1 * | 9/2010 | Ohtsuka et al. | 385/72 |
| 2010/0284654 | A1 * | 11/2010 | Ohtsuka et al. | 385/65 |
| 2010/0290740 | A1 * | 11/2010 | Ohtsuka et al. | 385/60 |

FOREIGN PATENT DOCUMENTS

| | | |
|---|---|---|
| JP | 2676705 | 7/1997 |
| JP | 2002-31745 | 1/2002 |
| JP | 2005-245753 | 9/2005 |
| JP | 2005-345753 | 12/2005 |
| JP | 2007-108358 A | 4/2007 |

* cited by examiner (b)

(a)

OPTICAL CONNECTOR AND METHOD OF ASSEMBLING THE SAME

RELATED APPLICATIONS

This application is the U.S. National Phase under 35 U.S.C. §371 of International Application No. PCT/JP2008/058680, filed on May 9, 2008, which in turn claims the benefit of Japanese Application No. 2007-137201, filed on May 23, 2007, the disclosures of which Applications are incorporated by reference herein.

TECHNICAL FIELD

The present invention relates to an optical connector and a method of assembling the same.

BACKGROUND ART

As an optical connector capable of easing a work for attaching the optical connector to an optical fiber on a spot at a working site and shortening a time required for the work, an optical connector shown in FIG. 6 has been developed.

An optical connector 100 shown herein has been disclosed in the following Patent Document 1 and serves to match a site optical fiber 104 maintained in a coated state with an end of a built-in optical fiber 102 provided in a ferrule 101 and to thus couple them to a rear end of the ferrule 101, and furthermore, to interpose and fix the site optical fiber 104 by means of a positioning mechanism 105 covering a periphery of a matched part.

The positioning mechanism 105 is a so-called splice member and includes a base member 111 provided with V grooves 111a and 111b for positioning the respective optical fibers 102 and 104 in such a manner that a center of the coated optical fiber 104 is coincident with that of the built-in optical fiber 102, a cover member 112 superposed on the base member 111 to press each of the optical fibers 102 and 104 against each of the V grooves 111a and 111b, and a clamp member 114 for energizing the base member 111 and the cover member 112 in a bonding direction.

A wedge is inserted in a joining surface of both the base member 111 and the cover member 112 and can be thus opened against an energizing force of the clamp member 114, and the optical fiber 104 is inserted in the V groove 111b and the wedge is then pulled out so that the optical fiber 104 is interposed and positioned between the base member 111 and the cover member 112 by the energizing force of the clamp member 114, which is not shown.

A plug housing 121 is put on and attached to the positioning mechanism 105.

The plug housing 121 is constituted by a front housing 125 having a step-like positioning portion 123 for positioning front end portions of the base member 111 and the cover member 112 which form the positioning mechanism 105 through a collision, and a rear housing 127 which accommodates the positioning mechanism 105 from a rear end side thereof and is thus coupled to a rear end of the front housing 125.

The rear housing 127 is coupled to and integrated with the front housing 125 by engaging an engaging projection 127b of an engaging portion 127a extended forward with an engaging portion 125a provided on the front housing 125.

The rear housing 127 includes a spring member 129 for energizing the positioning mechanism 105 forward to elastically position the front end portions of the base member 111 and the cover member 112 in an abutting state on the positioning portion 123 of the front housing 125.

A boot 131 for protecting the optical fiber 104 extended from the positioning mechanism 105 is put on and attached to a rear part of the rear housing 127. Moreover, a connector knob for offering an appearance is put on and attached to an outer periphery of the plug housing 121, which is not shown.

In the optical connector 100, the positioning mechanism 105 and the ferrule 101 are elastically supported by the spring member 129 accommodated in the rear housing 127. In a connection to a partner optical connector, therefore, the ferrule 101 abutting on the partner optical connector can be moved backward by an elastic force to relieve a shock.

In the optical connector 100, moreover, it is possible to finish a connector assembling work by simply matching the site optical fiber 104 with the end of the built-in optical fiber 102 in the positioning mechanism 105 without peeling the coating. In the assembling work on the site, therefore, peeling of the coating of the site optical fiber 104 to expose a core wire, and furthermore, a time and labor for cleaning the exposed core wire are not required. Consequently, it is possible to simplify a processing on the site, thereby enhancing a workability.

Patent Document 1: Japanese Laid-Open Patent Publication No. 2005-345753

DISCLOSURE OF THE INVENTION

Problems that the Invention is to Solve

In case of the optical connector 100, however, the end face of the built-in optical fiber 102 provided in the ferrule 101 directly collides with the end face of the site optical fiber 104 in the positioning mechanism 105. Therefore, there is a possibility that a problem might be caused, for example, the end face of the built-in optical fiber 102 might be broken depending on a colliding state in an insertion of the site optical fiber 104 into the positioning mechanism 105.

Moreover, it is necessary to previously carry out a polishing processing over the end face of the optical fiber 102 provided in the ferrule 101 in an inserting state through the ferrule 101 in a factory. There is also a problem in that the processing causes an increase in a cost of the optical connector.

In order to solve the problem, it is an object of the invention to provide an optical connector which does not cause a problem, for example, a breakage of an end face of a built-in optical fiber and does not need a polishing processing over the end face of the built-in optical fiber when assembling a site optical fiber, thereby enabling a more reduction in a cost of a work for carrying out an assembly into the site optical fiber, and a method of assembling the optical connector.

Means for Solving the Problems (1) In order to solve the problem, an optical connect according to the invention is an optical connector in which a protecting member for transmitting a light in a predetermined refractive index is stuck to a tip surface of a ferrule having a fiber inserting hole penetrating therethrough with the fiber inserting hole covered, wherein an optical fiber positioned by a positioning mechanism to be coupled to a rear part of the ferrule has a tip surface inserted through the fiber inserting hole of the ferrule to abut on the protecting member with an elastic force.

According to the structure, the site optical fiber is inserted through the positioning mechanism and the ferrule and is positioned and fixed by the positioning mechanism until the end face is subjected to the cut processing and a fresh end face then abuts on the protecting member with the elastic force. Thus, the optical connector is completely assembled. In other words, it is not necessary to provide the built-in optical fiber in the ferrule. For this reason, there is not caused a problem, for example, a breakage of the built-in optical fiber due to the collision of the site optical fiber which is inserted.

Moreover, the tip surface of the ferrule is provided with the protecting member. Therefore, it is not necessary to previously carry out the polishing processing over the end face of the built-in optical fiber. Consequently, it is also possible to correspondingly reduce a cost. Accordingly, it is possible to reduce a cost for assembling the connector into the site optical fiber more greatly.

In the protecting member provided on the tip surface of the ferrule, furthermore, an adhesiveness is given to only the ferrule side. Thus, the protecting member can easily be attached to the ferrule and dust can be prevented from sticking onto an external surface.

(2) In the optical connector, the protecting member may have a refractive index which is equal to a refractive index of a core of the optical fiber.

Consequently, it is possible to reduce a light transmission loss as greatly as possible, and furthermore, to obtain a high return loss.

(3) In the optical connector, the protecting member may take a shape of a sheet having a thickness of 5 to 30 μm.

By setting the film thickness of the protecting member to be small, thus, it is possible to reduce the light transmission loss as greatly as possible.

(4) In the optical connector, a flexure space for accommodating the optical fiber in a flexing state may be provided between a rear end of the ferrule and a tip side of the positioning mechanism.

Consequently, it is possible to obtain a state in which the tip of the site optical fiber abuts on the protecting member by a predetermined elastic force through a simple insertion of the optical fiber to generate a flexure in the flexure space. Accordingly, it is possible to maintain a stable connecting state in which the tip surface of the optical fiber always abuts on the protecting member even if the optical connector having a different coefficient of linear expansion from that of the optical fiber is extended in an axial direction depending on an ambient environment.

(5) In the optical connector, the ferrule and the positioning mechanism may be fabricated by integral molding.

Consequently, it is possible to reduce the number of the components constituting the optical connector, thereby promoting an enhancement in an assembling property and a reduction in a cost.

(6) A method of assembling the optical connector according to the invention is a method of assembling the optical connector according to any of claims 1 to 5, wherein an end of an optical fiber is subjected to a cut processing, the optical fiber subjected to the cut processing is inserted through a ferrule of the optical connector to cause a tip of the optical fiber to come in elastic contact with the protecting member, and the optical fiber is fixed by the positioning mechanism in this state.

Thus, the site optical fiber is inserted through the ferrule by simply cutting the end without peeling the coating. Consequently, it is possible to save a time and labor required for peeling the coating, thereby easing a work for assembling an optical connector on the site.

ADVANTAGE OF THE INVENTION

According to the optical connector and the method of assembling the optical connector in accordance with the invention, the site optical fiber is inserted through the positioning mechanism and the ferrule and is positioned and fixed by the positioning mechanism until the end face is subjected to the cut processing and a fresh end face then abuts on the protecting member with the elastic force. Thus, the optical connector is completely assembled. In other words, it is not necessary to provide the built-in optical fiber in the ferrule. For this reason, there is not caused a problem, for example, a breakage of the built-in optical fiber due to the collision of the site optical fiber which is inserted.

Moreover, the tip surface of the ferrule is provided with the protecting member. Therefore, it is not necessary to previously carry out the polishing processing over the end face of the built-in optical fiber. Consequently, it is also possible to correspondingly reduce a cost. Accordingly, it is possible to reduce a cost for assembling the connector into the site optical fiber more greatly.

EXPLANATION OF DESIGNATIONS

1 . . . optical connector, 3 . . . ferrule, 5 . . . positioning mechanism, 7 . . . plug housing, 9 . . . connector knob, 11 . . . boot, 14 . . . optical fiber, 15 . . . fiber inserting hole, 17 . . . protecting member, 17a . . . external surface, 21 . . . base member, 21a . . . V groove, 22 . . . cover member, 24 . . . clamp member, 33 . . . front housing, 33a . . . engaging portion, 35 . . . rear housing, 35a . . . engaging portion, 35b . . . engaging projection, 37 . . . spring member, 41 . . . flexure space, 43 . . . flexure.

BEST MODE FOR CARRYING OUT THE INVENTION

A suitable embodiment of an optical connector and a method of assembling the optical connector according to the invention will be described below in detail with reference to the drawings.

Figure 1:
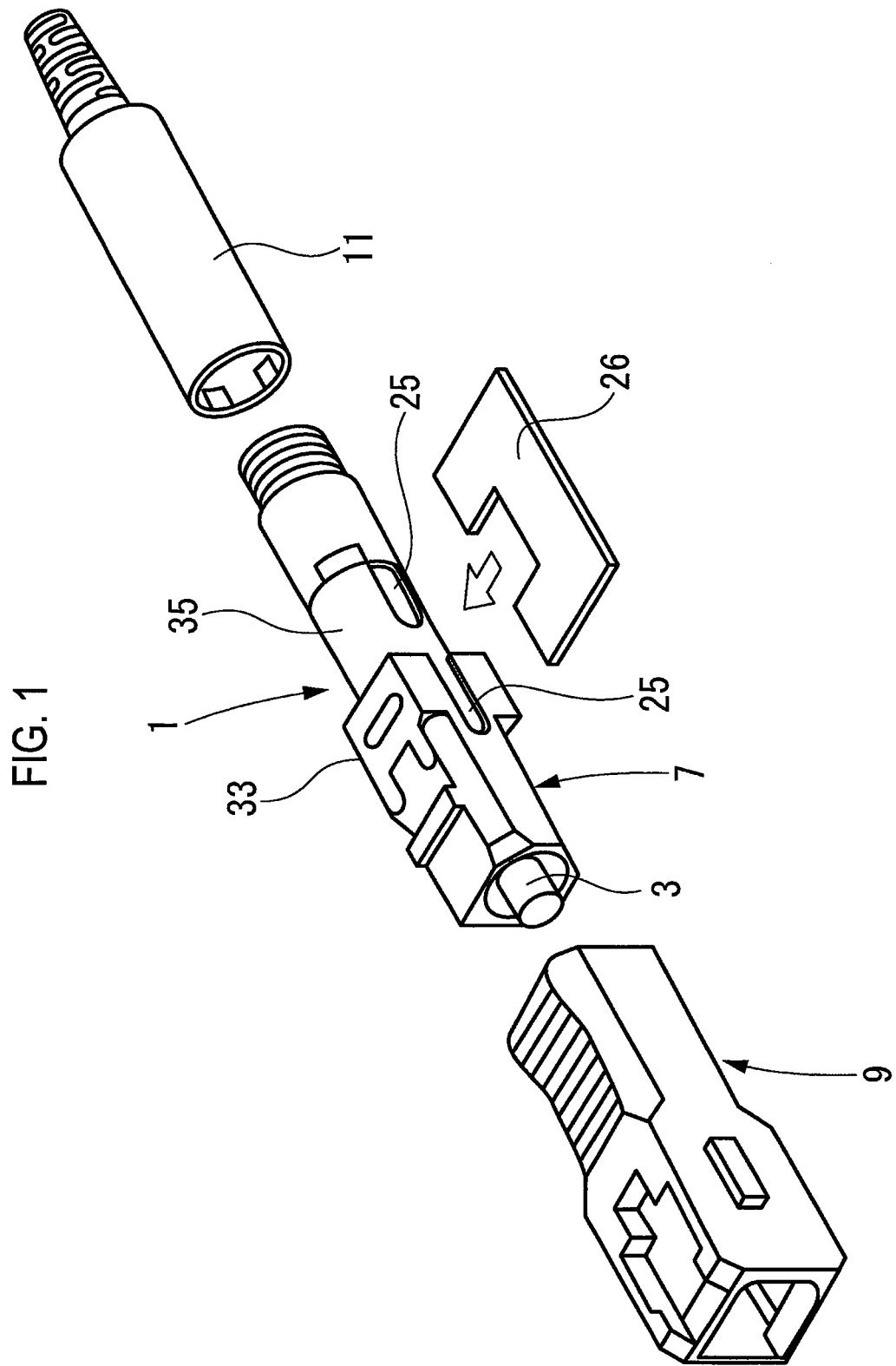
FIG. 1 is an exploded perspective view showing a schematic structure according to an embodiment of the optical connector in accordance with the invention.
Figure 2:
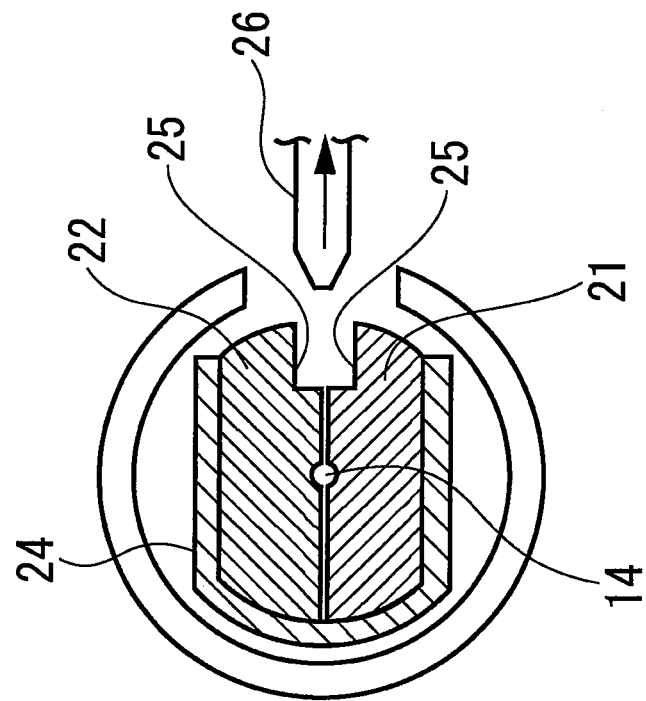
FIG. 2 is a cross-sectional view showing the optical connector illustrated in FIG. 1, (a) is a view showing a state that a positioning mechanism is opened, and (b) is a view showing a state that the positioning mechanism is closed.
Figure 2:
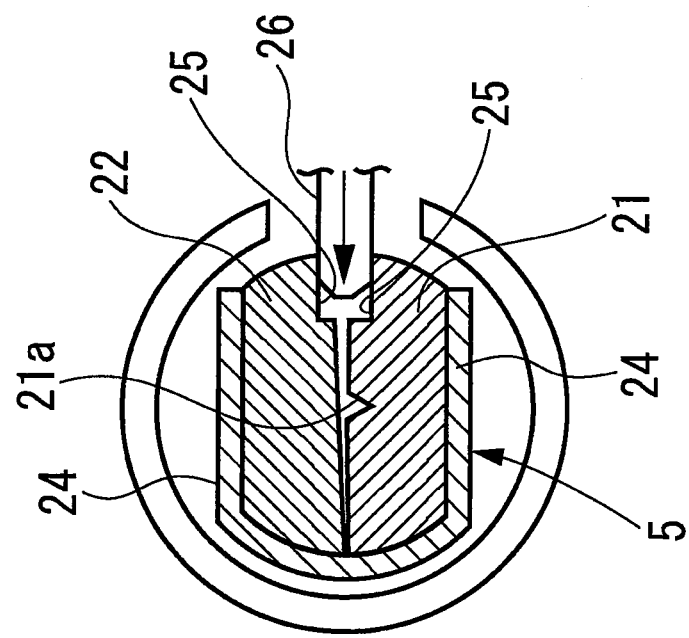
Figure 3:
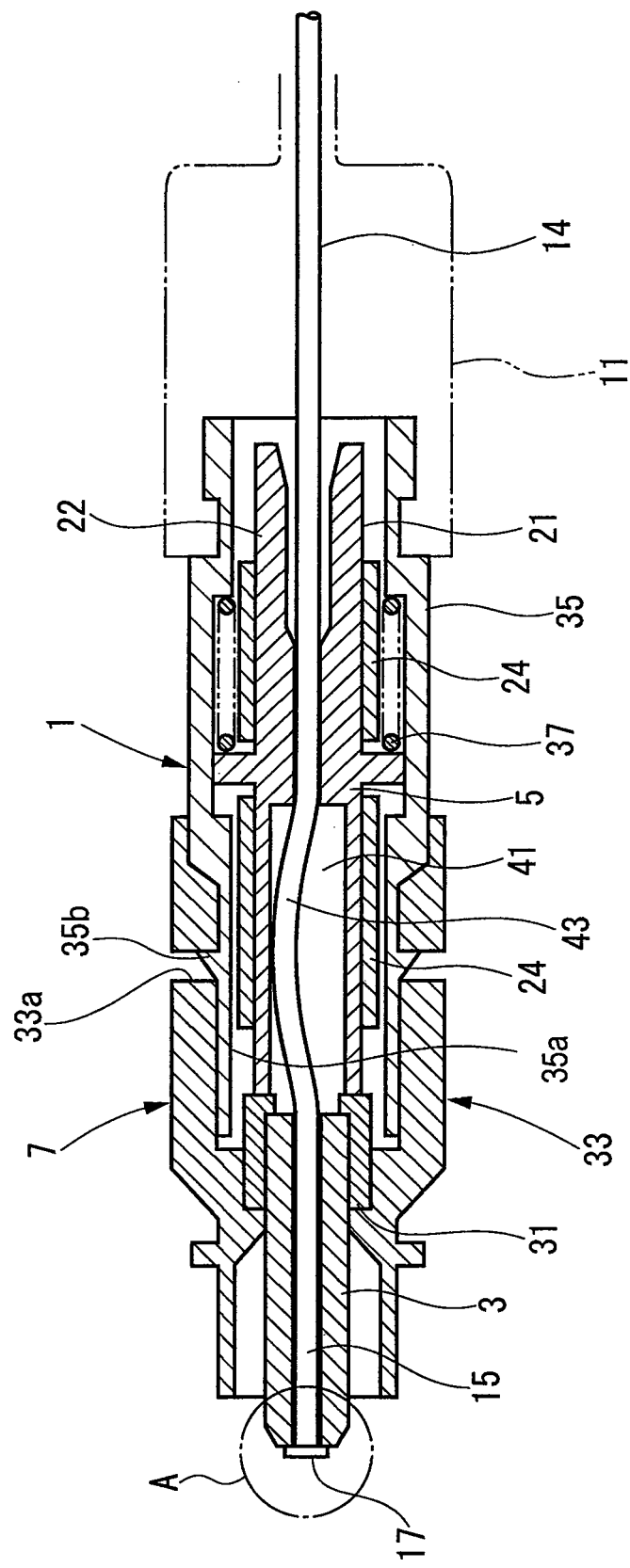
FIG. 3 is a longitudinal sectional view showing a connector plug assembly illustrated in FIG. 1.
Figure 4:
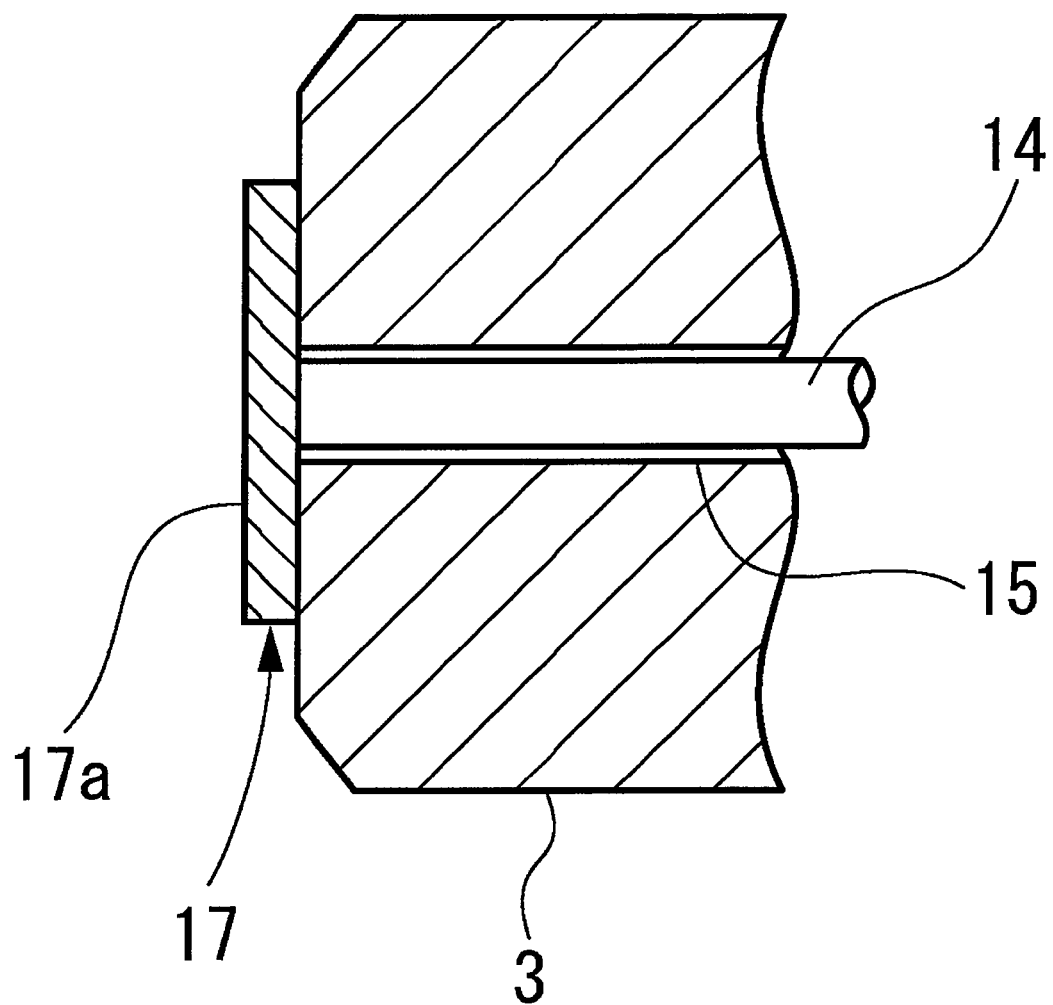
FIG. 4 is an enlarged view showing an A portion in FIG. 3.
Figure 5:
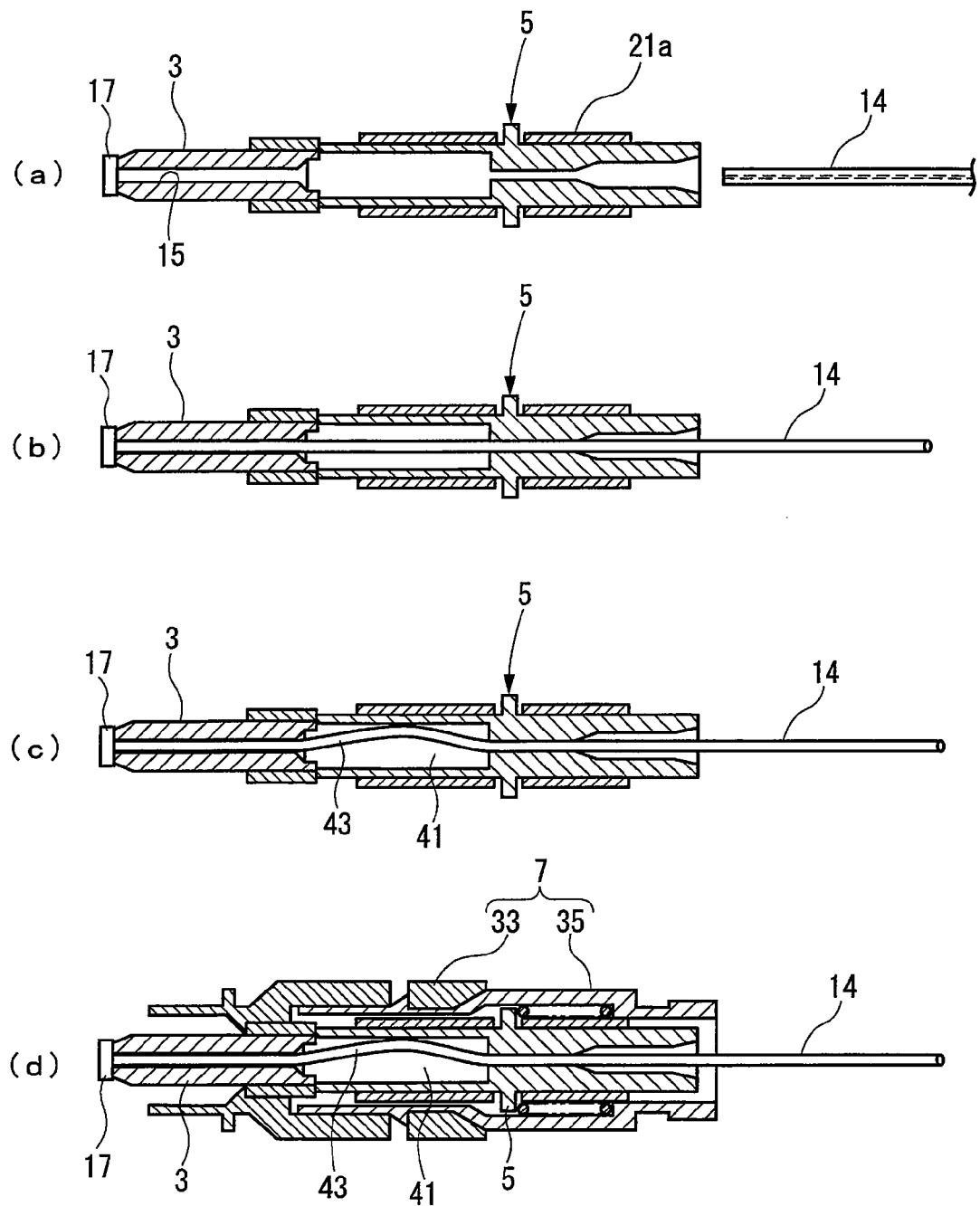
FIG. 5 is an explanatory view showing a procedure for a method of assembling a site optical fiber into the optical connector illustrated in FIG. 1.
Figure 6:
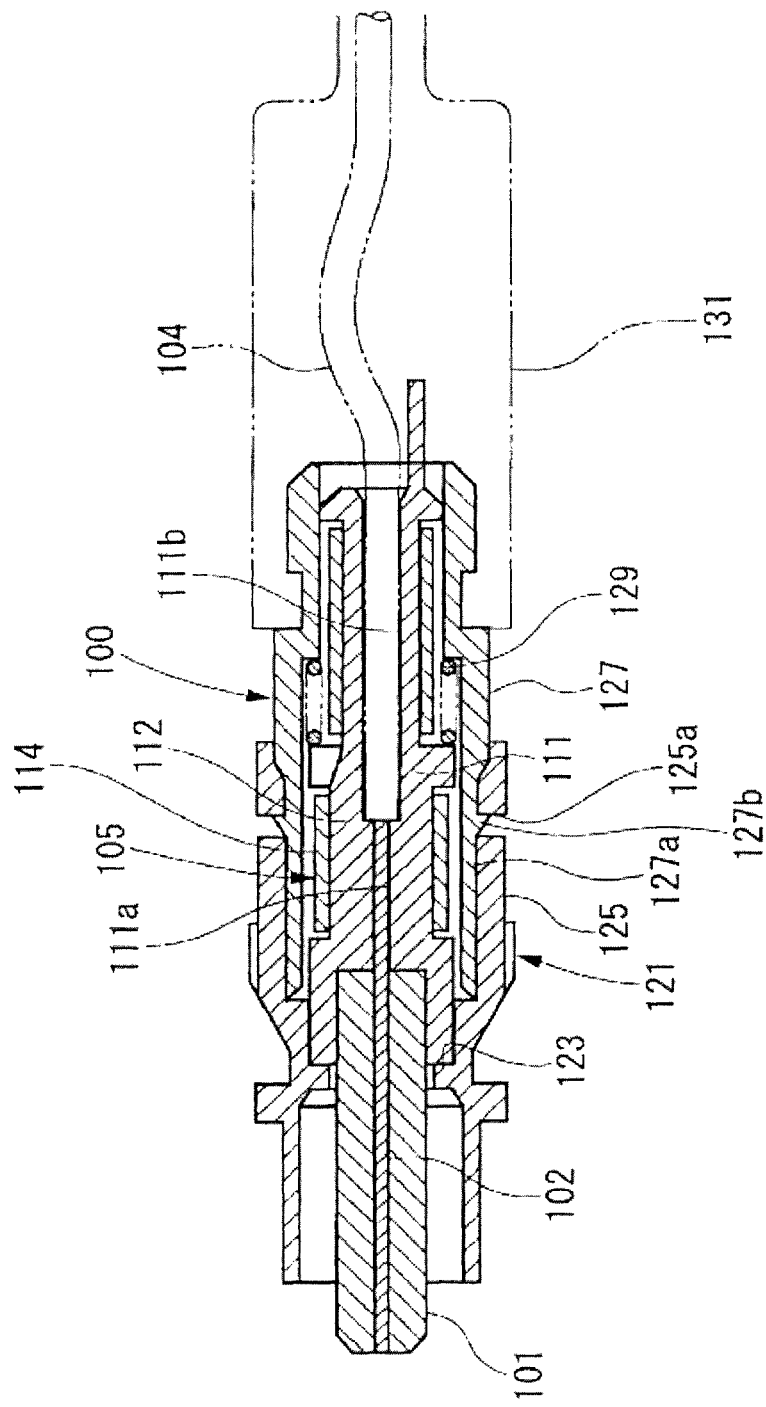
FIG. 6 is a longitudinal sectional view showing a structure according to a prior art optical connector.

FIG. 1 is an exploded perspective view showing a schematic structure according to an embodiment of the optical connector in accordance with the invention, FIG. 2 is a cross-sectional view showing an operation for opening/closing a positioning mechanism of the optical connector illustrated in FIG. 1 by inserting a wedge, FIG. 3 is a longitudinal sectional view showing a connector plug assembly illustrated in FIG. 1, FIG. 4 is an enlarged view showing an A portion in FIG. 3, and FIG. 5 is an explanatory view showing a procedure for a method of assembling a site optical fiber into the optical connector illustrated in FIG. 1.

An optical connector 1 according to the embodiment is an SC connector to be assembled into a site optical fiber and is constituted by a plug housing 7 for accommodating a ferrule 3 and a positioning mechanism 5 to be coupled to a rear end of the ferrule 3, thereby forming a connector plug assembly, a connector knob 9 put on and attached to the plug housing 7 from a forward part, and a boot 11 put on and attached to a rear end of the plug housing 7 as shown in FIGS. 1 to 3.

A fiber inserting hole 15 (see FIG. 4) for inserting a site optical fiber 14 having a coating is formed on a central axis to penetrate the ferrule 3.

An almost sheet-like protecting member 17 for transmitting a light in a predetermined refractive index is stuck to a tip surface of the ferrule 3 with the fiber inserting hole 15 covered. The protecting member 17 has a refractive index which is equal to that of a core of the optical fiber 14.

Moreover, the protecting member 17 takes a shape of a sheet having a thickness of 5 to 30 μm, and an adhesiveness for applying an adhesive material and sticking to the ferrule 3 is given to a surface on a side to come in contact with the ferrule 3. An external surface 17a of the protecting member 17 has no adhesiveness and dust sticks thereto with difficulty.

The positioning mechanism 5 is a so-called splice member and includes a base member 21 provided with a V groove 21a for positioning the optical fiber 14 in such a manner that a center of the optical fiber 14 having a coating is coincident with that of the positioning mechanism 5, a cover member 22 superposed on the base member 21 to press the optical fiber 14 against the V groove 21a, and a clamp member 24 for energizing the base member 21 and the cover member 22 in a bonding direction as shown in FIG. 2.

The base member 21 and the cover member 22 in the positioning mechanism 5 can be opened against an energizing force of the clamp member 24 through an insertion of a wedge 26 into a wedge inserting portion 25 formed on a joining surface of both of them as shown in FIG. 2(a), and the optical fiber 14 is inserted into the V groove 21a and the wedge 26 is then pulled out as shown in FIG. 2(b) so that the optical fiber 14 is interposed and positioned between the base member 21 and the cover member 22 by the energizing force of the clamp member 24.

As shown in FIG. 3, a flexure space 41 for causing the inserted optical fiber 14 to have an elastic force toward the protecting member 17 side by accommodating the optical fiber 14 in a flexing state is provided between the rear end of the ferrule 3 and a tip side of the positioning mechanism 5.

In the embodiment, the flexure space 41 is formed by hollowing a tip side of the base member 21 and the cover member 22 which form the positioning mechanism 5.

The optical fiber 14 inserted through the ferrule 3 and the positioning mechanism 5 is interposed and fixed by the positioning mechanism 5 after an amount of the insertion of the optical fiber 14 into the positioning mechanism 5 is regulated to generate a flexure 43 in the flexure space 41. Thus, a tip surface of the optical fiber 14 which is positioned is maintained in an abutting state on the protecting member 17 provided on the tip of the ferrule 3 with an elastic force.

The plug housing 7 is constituted by a front housing 33 having a step-like positioning portion 31 which positions, through a collision, the front end portions of the base member 21 and the cover member 22 which form the positioning mechanism 5, and a rear housing 35 which accommodates the positioning mechanism 5 from a rear end side thereof and is thus coupled to a rear end of the front housing 33.

As shown in FIG. 3, the rear housing 35 is coupled to and integrated with the front housing 33 by engaging an engaging projection 35b of an engaging portion 35a extended forward with an engaging portion 33a provided on the front housing 33.

The rear housing 35 includes a spring member 37 for energizing the positioning mechanism 5 forward to elastically position the front end portions of the base member 21 and the cover member 22 in an abutting state on the positioning portion 31 of the front housing 33.

The boot 11 put on and attached to the rear part of the rear housing 35 covers a periphery of the optical fiber 14 extended from the positioning mechanism 5 and protects the optical fiber 14 to prevent bending from being suddenly applied to the optical fiber 14.

In the optical connector 1 described above, the positioning mechanism 5 and the ferrule 3 are elastically supported movably in a rearward direction by means of the spring member 37 accommodated in the rear housing 35. In a connection to a partner optical connector, therefore, the ferrule 3 abutting on the partner optical connector can be moved rearward by an elastic force to relieve a shock.

Next, description will be given to a method of assembling the connector according to the invention.

The optical connector 1 is assembled in a procedure shown in FIGS. 5(a) to 5(d).

First of all, as shown in FIG. 5(a), the positioning mechanism 5 coupled to the rear end of the ferrule 3 is prepared in a state in which it is opened by the insertion of the wedge 26, and the end of the site optical fiber 14 is subjected to a cut processing. As shown in FIG. 5(b), subsequently, the optical fiber 14 subjected to the cut processing is inserted through the positioning mechanism 5 and the ferrule 3. As shown in FIG. 5(c), next, the amount of the insertion of the optical fiber 14 is regulated in such a manner that the optical fiber 14 inserted through the ferrule 3 generates the flexure 43 in a proper amount in the flexure space 41, and the wedge 26 is then pulled out of the positioning mechanism 5. Consequently, the optical fiber 14 inserted in the ferrule 3 is fixed by the positioning mechanism 5 with the tip coming in elastic contact with the protecting member 17. As shown in FIG. 5(d), thereafter, the front housing 33 and the rear housing 35 in the plug housing 7 are put on and attached to the positioning mechanism 5. Furthermore, the boot 11 is attached to the rear end of the plug housing 7 and the connector knob 9 is attached to the outer periphery of the plug housing 7, which is not shown. Thus, the optical connector 1 is completely assembled.

In the optical connector 1 according to the embodiment described above, an end face of the site optical fiber 14 is subjected to a cut processing, and the optical fiber 14 is inserted through the positioning mechanism 5 and the ferrule 3 until the end face abuts on the protecting member 17 with an elastic force, and furthermore, the optical fiber 14 is caused to have the flexure 43 in the flexure space 41 and is then positioned and fixed by the positioning mechanism 5. Thus, the assembly is completed.

In other words, since the built-in optical fiber is omitted, there is not caused a problem, for example, a breakage of the end face of the built-in optical fiber due to the collision of the site optical fiber 14 which is inserted in the ferrule 3. Moreover, the protecting member is provided on the tip surface of the ferrule so that it is not necessary to carry out a polishing processing over the end face of the built-in optical fiber. Therefore, it is also possible to reduce a cost correspondingly. Accordingly, it is possible to reduce a cost for assembling the connector into the site optical fiber 14 more greatly.

Furthermore, the protecting member 17 provided on the tip surface of the ferrule 3 can easily be attached to the ferrule 3 by giving an adhesiveness to only the ferrule 3 side, and can prevent dust from sticking onto an external surface. Thus, the protecting member 17 is effective for protecting the tip surface of the optical fiber 14 to abut on the protecting member 17.

In the optical connector 1 according to the embodiment, moreover, the protecting member 17 has a refractive index which is equal to that of the core of the site optical fiber 14.

Therefore, it is possible to reduce a light transmission loss as greatly as possible and to obtain a high return loss.

In the optical connector 1 according to the embodiment, furthermore, the protecting member 17 takes a shape of a sheet having a thickness of 5 to 30 μm. By setting the film thickness of the protecting member 17 to be small, thus, it is possible to reduce the light transmission loss as greatly as possible.

In the optical connector 1 according to the embodiment, moreover, the flexure space 41 for accommodating the optical fiber 14 in a flexing state to cause the optical fiber 14 to have an elastic force turned toward the protecting member 17 side is provided between the rear end of the ferrule 3 and the tip side of the positioning mechanism 5.

By simply inserting the site optical fiber 14 to generate the flexure 43 in the flexure space 41, therefore, it is possible to obtain a state in which the tip of the inserted optical fiber 14 abuts on the protecting member 17 by a predetermined elastic force. Thus, it is possible to easily obtain a stable connecting state in which the tip surface of the optical fiber 14 always abuts on the protecting member 17.

As shown in FIG. 5, furthermore, the end of the site optical fiber 14 is subjected to the cut processing, the optical fiber 14 subjected to the cut processing is exactly inserted through the positioning mechanism 5 and the ferrule 3 in the optical connector 1 without the coating peeled and the tip of the optical fiber 14 is thus caused to come in elastic contact with the protecting member 17, and the optical fiber 14 is fixed by the positioning mechanism 5 in this state. Consequently, it is possible to bring a state in which the optical connector 1 is assembled into the optical fiber 14.

In other words, referring to the assembling method according to the embodiment, by simply cutting the end of the site optical fiber 14 without peeling the coating and inserting the optical fiber 14 through the ferrule 3, it is possible to save a time and labor required for peeling the coating, thereby completing the connector assembling work on the site.

In the optical connector 1 according to the embodiment, the ferrule 3 and the positioning mechanism 5 are separate members.

However, it is also possible to employ a structure in which the ferrule 3 and the positioning mechanism 5 are fabricated by integral molding.

With the integral structure, thus, it is possible to reduce the number of the components constituting the optical connector 1, thereby promoting an enhancement in an assembling property and a reduction in a cost.

Although the invention has been described in detail with reference to the specific embodiment, it is apparent to the skilled in the art that various changes and modifications can be made without departing from the spirit and scope of the invention. The application is based on Japanese Patent Application (JP-A-2007-137201) filed on May 23, 2007 and contents thereof are incorporated herein by reference.

The invention claimed is:

1. An optical connector comprising:
a protecting member for transmitting a light in a predetermined refractive index, the protecting member being fixed to a tip surface of a ferrule having a fiber inserting hole penetrating the ferrule, and the fiber inserting hole being covered by the protecting member,
wherein an optical fiber, positioned by a positioning mechanism to be coupled to a rear part of the ferrule, has a tip surface inserted through the fiber inserting hole of the ferrule to abut against the protecting member with an elastic force to generate flexure in the optical fiber, and
wherein the protecting member takes a shape of a sheet having a thickness of 5 to 30 μm.

2. The optical connector according to claim 1, wherein the protecting member has a refractive index which is equal to a refractive index of a core of the optical fiber.

3. The optical connector according to claim 1, wherein a flexure space for accommodating the optical fiber in a flexing state is provided between the rear part of the ferrule and a tip side of the positioning mechanism.

4. The optical connector according to claim 1, wherein the ferrule and the positioning mechanism are fabricated by integral molding.

5. A method of assembling the optical connector according to claim 1, wherein an end of an optical fiber is subjected to a cut processing, the optical fiber subjected to the cut processing is inserted through a ferrule of the optical connector to cause a tip of the optical fiber to come in elastic contact with the protecting member, and the optical fiber is fixed by the positioning mechanism in this state.

* * * * *